(12) United States Patent
Pang et al.

(10) Patent No.: US 7,698,397 B2
(45) Date of Patent: Apr. 13, 2010

(54) METHOD AND FRAMEWORK FOR PROVIDING SYSTEM PERFORMANCE INFORMATION

(75) Inventors: Jee Fung Pang, Woodinville, WA (US); Jen-Lung Chiu, Redmond, WA (US); Melur K. Raghuraman, Sammamish, WA (US); Insung Park, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1098 days.

(21) Appl. No.: 10/608,864

(22) Filed: Jun. 27, 2003

(65) Prior Publication Data

US 2005/0033766 A1 Feb. 10, 2005

(51) Int. Cl.
*G06F 15/173* (2006.01)
(52) U.S. Cl. .................. 709/223; 709/224; 718/328; 718/329
(58) Field of Classification Search .............. 709/215, 709/223, 224; 707/104; 718/328, 329
See application file for complete search history.

(56) References Cited

U.S. PATENT DOCUMENTS

| | | | |
|---|---|---|---|
| 5,819,030 | A | 10/1998 | Chen et al. |
| 5,835,702 | A * | 11/1998 | Levine et al. ............. 714/39 |
| 6,467,052 | B1 | 10/2002 | Kaler et al. |
| 6,671,829 | B2 | 12/2003 | Kaler et al. |
| 6,671,830 | B2 | 12/2003 | Kaler et al. |
| 6,691,254 | B2 | 2/2004 | Kaler et al. |
| 6,708,293 | B2 | 3/2004 | Kaler et al. |
| 6,742,143 | B2 | 5/2004 | Kaler et al. |
| 6,789,046 | B1 | 9/2004 | Murstein et al. |
| 6,892,236 | B1 | 5/2005 | Conrad et al. |
| 7,509,656 | B2 * | 3/2009 | Bian et al. ............. 719/328 |
| 2003/0046383 | A1 | 3/2003 | Lee et al. |
| 2003/0126509 | A1 | 7/2003 | Kaler et al. |
| 2003/0140280 | A1 | 7/2003 | Kaler et al. |
| 2004/0019894 | A1 | 1/2004 | Willard et al. |

OTHER PUBLICATIONS

Jack Dongarra et al., Using PAPI for Hardware Performance Monitoring on Linux Clusters, Jun. 25-27, 2001, Linux Cluster: The HPC Revolution 2001 Technical Papers, 14 pages.*

* cited by examiner

*Primary Examiner*—Vivek Srivastava
*Assistant Examiner*—Adnan Mirza
(74) *Attorney, Agent, or Firm*—Marshall, Gerstein & Borun LLP

(57) ABSTRACT

A framework and method are disclosed for providing/consuming data items. A memory structure is created within an address space allocated to a provider application. The memory structure stores performance counter data generated by the provider application. The counter provider application registers a counter provider and an associated performance counter memory structure via a set of application program interface methods. Thereafter, a counter provider consumer application, via additional application program interface methods, determines the identity of the performance counter provider, sets up a buffer to receive the counter data of the counter provider, and requests extraction of the counter data stored within the performance counter memory structure. The transfer of data from the provider application to the consumer application occurs through the system API.

25 Claims, 6 Drawing Sheets

| 410 | Dataset Template |
| --- | --- |
| 420 | DataItem Schema |
| 430 | Dataset Instance Block |
| 440 | Registration Information |
| 450 | Dataset Registration Information |
| 460 | Counter Registration |
| 470 | DataItem Identifier List |
| 480 | Datablock Header |
| 490 | DataItem Header |
| 492 | Single DataItem |
| 494 | Multi Instance |

FIG. 4

| 500 | RegisterInstrumentationSchema |
| --- | --- |
| 510 | UnregisterInstrumentationSchema |
| 520 | RegisterInstrumentationDataSource |
| 530 | SetEnableInstrumentationInstrumentationNotification |
| 540 | UnregisterInstrumentationDataSource |
| 545 | SetDatasetTemplate |
| 550 | CreateInstanceBlock |
| 560 | DeleteInstanceBlock |

FIG. 5

| 600 | EnumerateDataset |
| --- | --- |
| 610 | QueryDatasetRegistrationInfo |
| 615 | EnumerateDatasetInstance |
| 620 | EnableCounterDataset |
| 630 | CreateQueryHandle |
| 635 | QueryDataItemInfo |
| 640 | QueryDataItemData |
| 650 | AddDataItems |
| 660 | DeleteDataItems |
| 670 | CloseQueryHandle |

FIG. 6

METHOD AND FRAMEWORK FOR PROVIDING SYSTEM PERFORMANCE INFORMATION

FIELD OF THE INVENTION

This invention generally relates to the area of computer systems. More particularly, the present invention concerns computer system performance evaluation utilities/tools, and in particular, methods and systems for monitoring and reporting statistical data regarding the operation of software systems such as operating system components. Performance counters are utilized by, for example, system administrators to monitor resource demand and throughput on servers.

BACKGROUND OF THE INVENTION

Performance counters are any of a variety of functional components/elements within software and hardware used to measure and/or quantify operational characteristics of systems. Though the term "counter" is used extensively herein, performance counters include a broad variety of performance measurement values including ones that are rendered by measurement mechanisms that do not accumulate counted events. For example, a counter value may correspond to an average delay period for carrying out a task. Performance counters are valuable tools in the development and maintenance of properly operating computing systems. Performance counters are relied upon by developers to identify architectural flaws, to verify proper system operation, and to measure throughput. Performance counters are widely used by network/server administrators to monitor/manage the operation of installed systems (e.g., monitoring usage of system resources to identify excessive use of resources and inadequate throughput to meet expected demand).

Performance counters are implemented for a variety of reasons. Performance counters are implemented to measure the effectiveness and capabilities of a system/application under a variety of load conditions. Such information can be used to identify potential/actual problems: system bottlenecks, hacker attacks, needs to re-allocate system resources, etc. Performance counters are also implemented to account for resource usage by particular identified entities. Such accounting can be used to identify particular entities for purposes of billing or merely monitoring usage by particular applications, components, users, etc. Performance counters also facilitate trend analysis by comparing the variations in the measured performance parameters over extended periods of time. In a development environment, performance counters facilitate performing regression analysis (did a change improve/degrade system performance), establishing system capacity (for customer/administrators), and determining whether a particular design goal has been met.

Performance counters also measure a variety of operational parameters. Performance counters measure activity level in the form of percent utilization of resources, disk I/O rates, response times (average), queue length (average), request throughput rate, etc. The performance counters also render measurements of resource usage at various levels of granularity (e.g., per process, per thread, per component, per object). Examples of such provided resource usage measurements include: process working set, thread CPU time, and database cache size. This is merely a small fraction of the virtually limitless number of different measurable parameter types rendered by performance counters.

In one type of performance counter arrangement, a provider/consumer model is adopted that separates performance counter design into two independent and distinct parts. A performance counter provider generates the raw counter information. The performance counter provider for an application containing performance counters, consists of software written specifically for the particular application with which it is associated. In a particular known performance counter provider/consumer arrangement, discussed herein below with reference to FIG. 2, a performance counter dynamically linked library (hereinafter "dll") is written specifically for a particular counter provider. The performance dll communicates with the application providing the raw counter data via inter-process communications.

A performance counter consumer, as the name suggests, receives and processes the raw performance counter data provided by the provider and presents it to a user. In the known performance counter architecture described herein below with reference to FIG. 2, the counter consumer accesses the raw performance counter data, which is rendered by the counter provider, via the performance dll. An example of a performance counter consumer is MICROSOFT WINDOWS Performance Monitor utility. When the counter consumer needs a particular performance counter, the consumer loads the performance dll and then calls an entry point into the dll. In response an inter-process communication link, such as shared memory, is established between the dll and the counter provider. A name is assigned to the shared memory by the provider's application and performance DLL. The provider places counter information within the shared memory location and the consumer retrieves the counter information via the dll using the shared memory. The dll, in response to requests from the consumer, retrieves the counter data from the shared memory, adds metadata to facilitate interpretation of the counter data by the consumer, and returns the data to the requesting consumer.

This prior arrangement for providing performance counters places responsibility for providing counters in the hands of provider authors. This approach presents a number of potential drawbacks. For example, the potential for name space conflicts exists. In particular, the performance dll may use a name that has been previously claimed. In that case, operation of the dll is blocked by the previous claimant of the shared memory name. As a consequence, the reliability of performance counters operating according to the performance dll approach is called into question.

SUMMARY OF THE INVENTION

The present invention comprises a method and framework for supporting performance counters rendered by counter providers for counter consumers such as system performance monitors. The performance counter framework is utilized to facilitate providing performance counter data by a performance counter provider application to a performance counter consumer application through calls to an application program interface. The performance counter framework in such a system includes an application program interface comprising a set of functions callable by the provider and consumer applications. On the provider side, the application program interface includes a counter registration function called by the performance counter provider application to register a performance counter structure that is maintained within an address space owned by the counter provider. In processing the registration call of the counter provider application, the counter registration function registers an access function for retrieving performance counter data from the performance counter structure.

The application program interface also includes, on the counter consumer side, a counter query function called by the performance counter consumer application to retrieve counter data from the performance counter structure within the address space of the counter provider application. The query submission by the counter consumer application to the application program interface causes the system to invoke the access function and thereby initiate retrieval of the counter data from the process space of the counter provider.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 4 is a table summarizing a set of data structures that facilitate registering and accessing performance counters in an embodiment of the present invention;

FIG. 5 is a set of provider-side functions/methods supported by an enhanced application program interface facilitating carrying out provider-side functionality without provider DLLs;

FIG. 6 is a set of consumer-side functions/methods supported by an enhanced application program interface facilitating carrying out consumer-side functionality without DLLs;

DETAILED DESCRIPTION OF THE DRAWINGS

In the illustrative embodiment of the present invention, a performance counter setup and delivery framework facilitates providing performance counters to consumer applications. Rather than utilizing performance dlls to deliver performance counters to requesting consumers. A counter provider, via a call to an API method supported by the operating system, registers under an identification such as a GUID, allocates space within its own memory address space for buffering the declared counters, and declares the performance counters to the operating system (providing appropriate descriptions for users to selectively request particular ones of the available counters). The operating system keeps a record of the registration, identified by the registered GUID as long as the provider's process exists. The counter provider updates its counters within its memory space, and the counters are available for the operating system to read and deliver to requesting consumers.

Consumers construct requests to the operating system, via an API supported by the operating system, identifying the GUID of the counter provider. The consumer supplies a buffer within its address space where requested counter values, from the identified counter provider, are to be returned. In response, the operating system looks up the GUID, locates the provider process, and calls an internally registered callback function to locate the requested performance counter values. The callback function, executing as a thread within the provider, then copies the requested data from the declared counters in the provider's address space into the return buffer specified in the callback function call. The consumer application is then notified by the operating system of the return buffer. The details of the performance dll-based prior art architecture and the API-based architecture of the present invention are described further herein below.

Before turning to the figures, it is noted that in an embodiment of the present invention computers implement steps described herein by executing software instructions, such as program modules. Generally, program modules include routines, objects, components, data structures and the like that facilitate performing particular tasks or implementing particular abstract data types. The term "program" includes one or more program modules.

Figure 1:
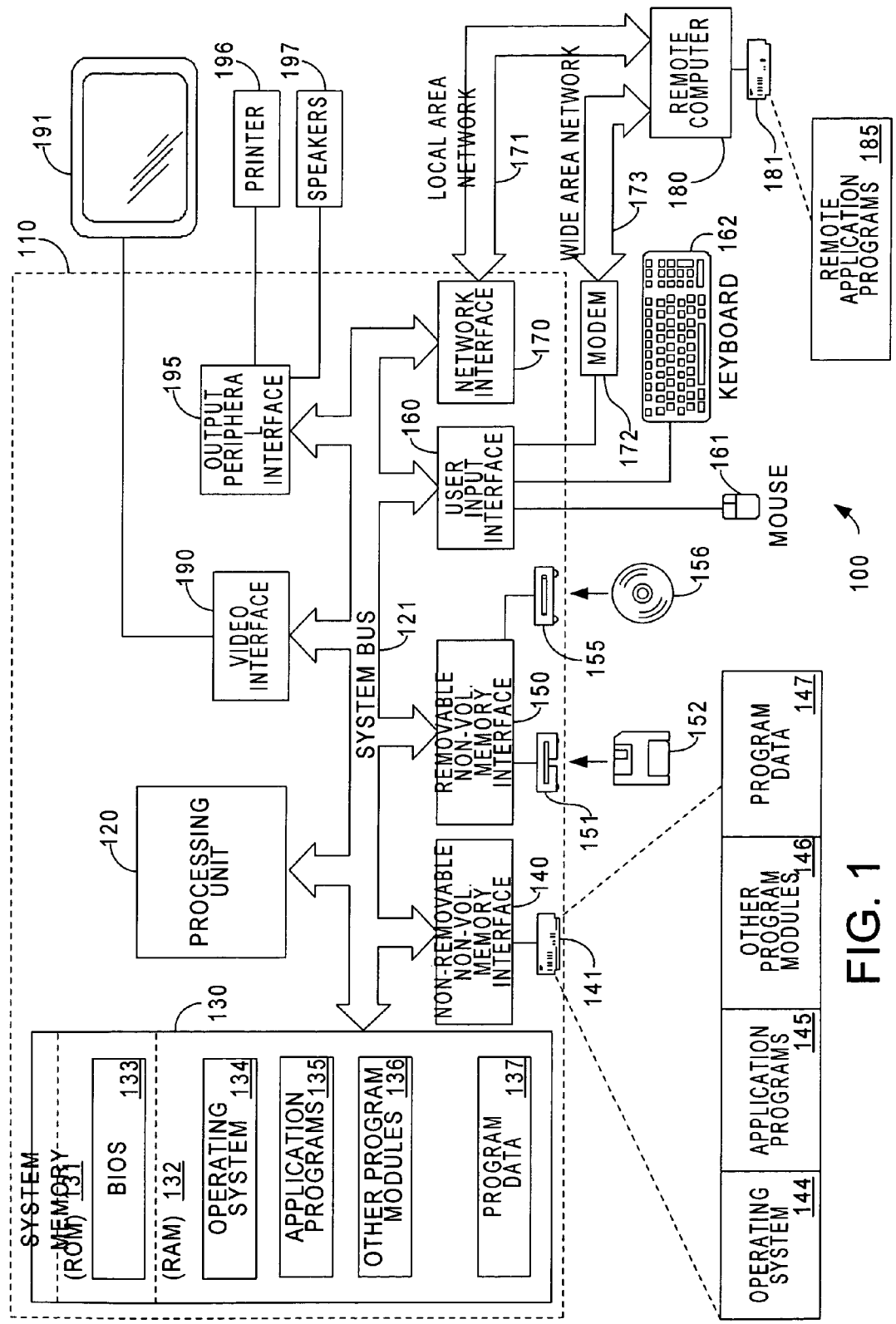
FIG. 1 is a simplified schematic illustrating an exemplary architecture of a computing device for carrying out performance data generation in accordance with an embodiment of the present invention.

FIG. 1 illustratively depicts an example of a suitable operating environment 100 for carrying out the API-based performance counter provider architecture in accordance with an embodiment of the present invention. The operating environment 100 is only one example of a suitable operating environment, and is not intended to suggest any limitation as to the scope of use or functionality of the invention. Other well known computing systems, environments, and/or configurations that may be suitable for use with the invention include, but are not limited to, personal computers, server computers, laptop/portable computing devices, multiprocessor systems, microprocessor-based systems, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is potentially incorporated within network nodes operating in distributed computing environments where tasks are performed by remote processing devices that are linked through a communications network. In a distributed computing environment, program modules are generally located in both local and remote computer storage media including memory storage devices.

With continued reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
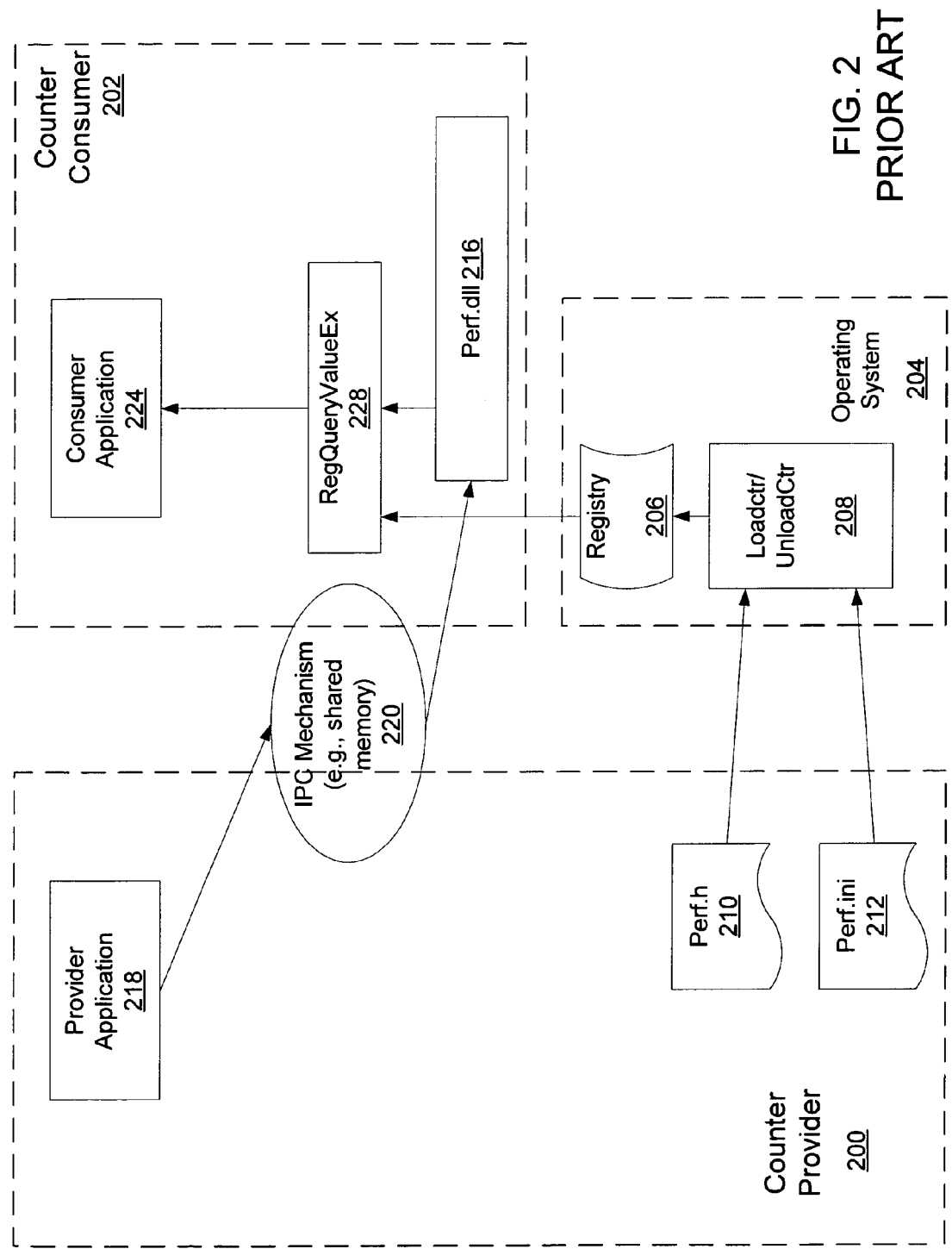
FIG. 2 is a schematic drawing of a prior art architecture provider/consumer model for performance counters relying upon performance dlls and shared memory as the performance counter setup and delivery mechanism.

Turning to FIG. 2, a prior art performance dll-based model for providing/consuming performance counters is schematically depicted. A counter provider 200 comprises a set of components that, in combination, facilitate providing performance counters to a counter consumer 202 comprising a set of components that, in combination, facilitate locating and accessing performance counters. An operating system 204 includes a registry 206 that enables the counter provider to register and de-register its performance dll. The registry 206 also includes descriptive information about the content of the provider 200's counters supplied by a perf.h 210 header file and a perf.ini initialization 212 file. The descriptive information is inserted into the registry by the loadctr method 208 and removed from the registry by the unloadctr method 208.

A performance dll 216, written particularly to extract counter information from an application 218, is responsible for establishing an inter-process communication mechanism 220 with the application. The IPC mechanism 220 is generally shared memory. Thereafter, the application 218 places counter data within the shared memory 220. The performance dll 216 packages the counter data from the application 218 for consumption by the counter consumer 202.

The counter consumer 202 locates the performance dll 216 through the registry 206. In particular, the counter consumer 202 includes an application 224, such as MICROSOFT WINDOWS' Performance Monitor utility. The application 224 calls a method 228, e.g., RegQueryValueEx, that interfaces with the registry 206 and extracts the name of the performance dll 216 that provides the performance counter information requested by the application 224.

Figure 3:
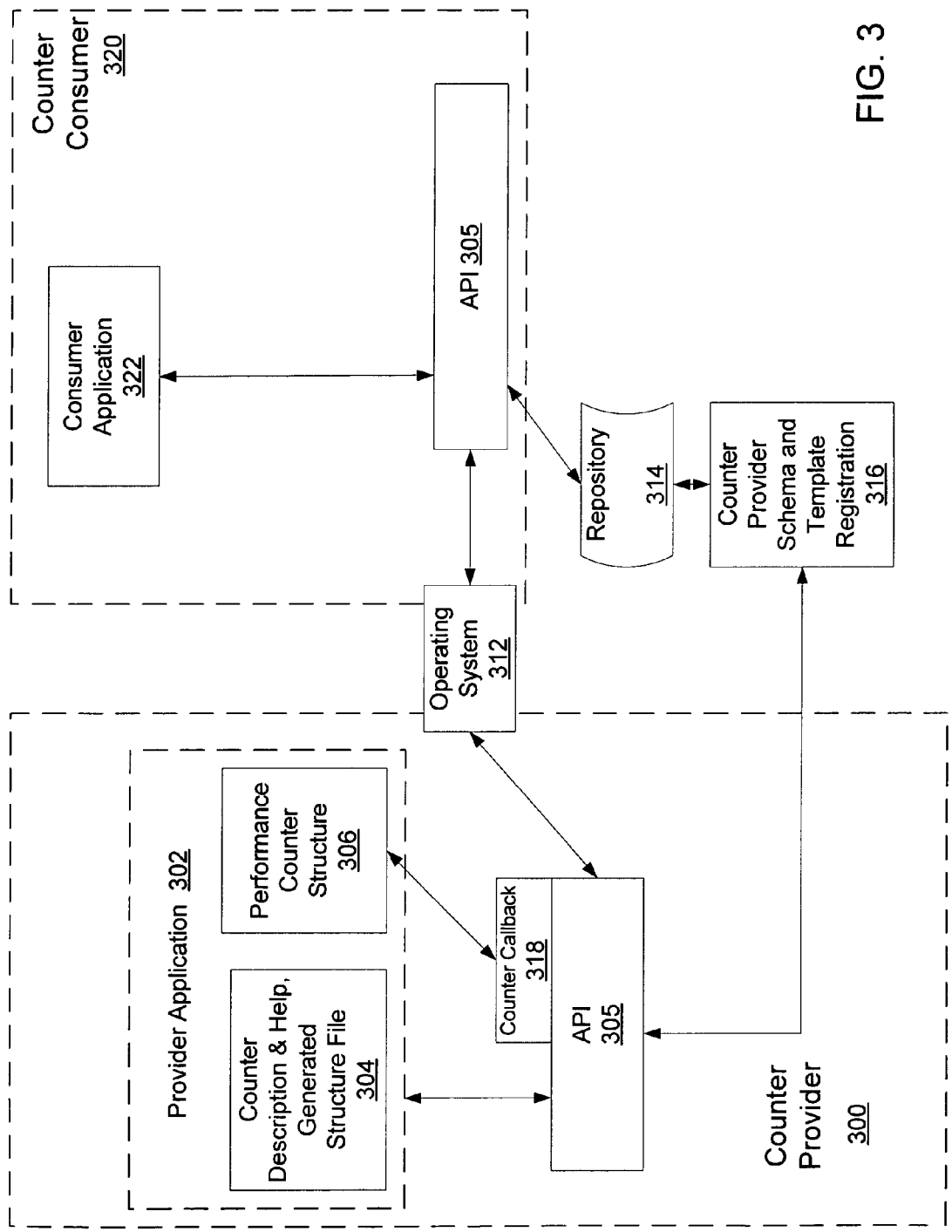
FIG. 3 is a schematic drawing of a performance counter architecture provider/consumer model relying, in accordance with an embodiment of the present invention, a set of operating system-supported application programming interface methods as the performance counter setup and delivery mechanism.

Turning now to FIG. 3, an API-based provider/consumer performance counter architecture is depicted. A counter provider 300 comprises operating system and application components including a provider application 302. An enhanced performance counter provider portion 304 of the provider application 302 supplies, through calls to an operating system API 305, counter and help descriptions that are maintained within a repository 314. The enhanced counter provider portion 304 also requests allocation of a performance counter structure 306, through the API 305, within address space allocated to the provider application 302. Thereafter, by way of example, a set of counter threads running within the provider application 302, rather than placing counter data within a shared memory (e.g., IPC mechanism 220), populates the counter structure 306 with performance counter information/values generated during the operation of the provider application 302.

The operating system API 305, on the counter provider 300 side, includes methods/functions that register/de-register a performance counter provider and allocate memory to the provider application 302 for the purpose of maintaining the counter structure 306. In a particular embodiment of the invention, an operating system component 312 receives, via the operating system API 305, registration and deregistration requests originating from the provider application 302. The operating system component 312 maintains the registration/deregistration requests and related information, in memory.

During application installation/system setup the provider application 302 calls a counter installation/de-installation interface 316, via the operating system API 305, to register its counter provider schema (an XML document) in a repository 314 thereby persisting the counter provider even when the application 302 itself is not active.

In an embodiment of the invention, the requests to register a performance counter provider dataset by the provider application 302 include a provider template, comprising a dataset template and a set of counter (also referred to herein as "dataitem") schema definitions specifying the content of the performance counter structure 306 associated with the performance counter dataset. By way of example, each counter schema is specified in XML, and includes a description of the counter data including: a data type, data size, and counter size. The provider template is stored, during the installation of the provider application 302, within the repository 314 via the counter installation/de-installation interface 316 supported by the repository 314. Because the provider template is stored outside the application 302's address space, the provider template can be queried without the provider application 302 running. At runtime, the application 302 registers a performance counter provider dataset within the repository 314 and references the previously stored provider template. The counter provider dataset is referenced by a GUID—thus ensuring that the counter provider dataset and its associated counters stored within the performance counter structure 306 are uniquely identified within the system.

The provider template describes and distinctly identifies each of the set of performance counters maintained by the counter provider dataset of the provider application 302. The distinctly identified counters of the counter provider dataset, represented in the repository 314 by the provider template, enables a requester to identify a particular subset of the counter values maintained within the performance counter structure 306.

Furthermore, as part of the registration process, a callback function 318 within the API 305 is automatically assigned with the provider application 302. In the embodiment depicted in FIG. 3, the callback function 318 is invoked (upon request by a counter consumer), by the operating system component 312, to retrieve all, or a portion of, the counter values/information maintained within the performance counter structure 306. The callback function 318 extracts and returns the requested counter values/information from the performance counter structure 306 contained within the address space allocated to the provider application 302.

Thus the performance counter provider/consumer architecture depicted in FIG. 3 differs in a number of ways from the prior art performance counter provider/consumer model depicted in FIG. 2. In particular, the performance dll 216 is not relied upon to communicate with the application to obtain counter data via the IPC mechanism 220. Instead, the provider application 302 maintains performance counter data within the performance counter structure 306. The performance counter structure 306 resides in memory space owned by the provider application 302. The contents of the performance counter structure 306 are retrieved via the callback function 318, registered with the system library (API 305), that executes within the provider application 302. The callback function 318 serves all requests directed to the counter provider dataset associated with the performance counter structure 306.

On the counter consumer side of the exemplary architecture depicted in FIG. 3, a counter consumer 320 operates substantially the same as the prior art counter consumer 202. A performance monitoring application 322 issues a request to the API 305 that interfaces the repository 314 and extracts the name (GUID) of a previously registered counter provider that provides the performance counter information requested by the application 322.

Thereafter, the application 322 requests all, or particular ones, of the performance counter values/information within the performance counter structure 306 via calls to the method supported by the API 305. The API 305, in turn, invokes the callback function 318 to retrieve and return the requested performance counter information from the performance counter structure 306. When the callback function 318 is invoked, the callback function 318 creates a thread (to the extent one does not already exist) within the address space of the provider application 302 to execute the callback function. Within the callback function, the thread extracts the counter values/information from the performance counter structure 306 and returns it to the operating system component 312. The operating system component 312 returns the requested performance counter data to a buffer designated by the consumer application 322 to receive the counter values/information. In an embodiment of the invention, the thread created in the provider application 302's address space handles all requests directed to the providing application 300. The thread persists for a period of inactivity and then terminates. Furthermore, though a single callback function 318 is identified in FIG. 3, the provider application 302 can register multiple callback routines that are maintained by the repository 314. This facilitates writing customized callback routines for the provider application 302 that exhibit differing behavior with regard to the form and content of returned performance counter information generated by the provider application 302 and stored in the performance counter structure 306.

It is noted that the architecture described in FIG. 3 related to a single machine containing both the provider and consumer. However, the present invention is also carried out on multiple machines. In such cases, remote procedure calls are issued, by way of example, between a machine having a performance counter consumer and a provider.

Having described an exemplary API-based provider/consumer performance counter architecture embodying the present invention, attention is directed to data structures that support the API-based architecture. In particular, turning to FIG. 4, a set of data structures utilized by the provider application 302 and the consumer application 322 are depicted.

In an embodiment of the invention, the provider application 302 specifies a counter provider template describing the content and organization of the performance counter structure 306 for a counter provider. The provider template is stored within the repository 314 during initialization of the counter provider application 302. The counter provider template generally includes a dataset definition defined according to a Dataset_Template structure 410 followed by a set of counter schemas arranged according to a DataItem_Schema structure 420. Exemplary arrangements for the Dataset_Template structure 410 and the DataItem_Schema structure 420 are defined herein below.

In an embodiment of the invention, the dataset template structure 410 is defined in the following manner.

```
typedef struct _DATASET_TEMPLATE {
    GUID      DatasetGuid;
    GUID      ParentDatasetGuid; // 0s if no parent dataset
    GUID      ProviderGuid;
    DWORD     DetailLevel;
    DWORD     DefaultCounterId;
    DWORD     NumCounters;
    DWORD     InstanceType;
} DATASET_TEMPLATE, * DATASET_TEMPLATE;
```

A dataset defines a collection of performance data. The DatasetGuid is a unique value assigned to a particular dataset such that two differing datasets will not have a same assigned identifier value. In the case where datasets need to be linked via a parent-child relationship, the ParentDatasetGuid references the parent dataset's GUID for this particular dataset. The ProviderGuid identifies the Provider class with which this DatasetTemplate is associated. The DetailLevel identifies the complexity of the counters of the dataset. The magnitude of the DetailLevel value corresponds to the computing cost for maintaining the associated values for the counter's dataset. The DefaultCounterId specifies a type of counter to be used with this dataset in the event that a counter class is not specified. The NumCounters identifies the number or counters used for this dataset. The InstanceType specifies whether there is a single instance of counters or that there will be multiple instances of similar sets of counters for the single instance of the registered counter provider.

In an embodiment of the invention, the DataItem_Schema structure 420 is defined in the following manner.

```
typedef struct _DATAITEM_SCHEMA {
    DWORD DataItemId;            // up to 64K counters
                                 per GUID instance
    DWORD Source
    DWORD Type;
    DWORD Attrib;
    DWORD Size;
    DWORD DetailLevel;
    DWORD Scale;
    DWORD DisplayType;
    DWORD Offset; // overlays to give the actual counter
location
} DATAITEM_SCHEMA, * PDATAITEM_SCHEMA;
```

In the exemplary structure set forth above, the DataItemId is an integer assigned to the particular counter. The Source specifies whether the counter is a physical count that can be directly exposed by a provider or a composite counter that is calculated from predefined operators and other counters. Each counter (data item) within a dataset is assigned its own unique DataItemId value. The Type field describes the datatype of values specified by the counter to facilitate interpretation of the counter's data (e.g., 32-bit signed integer). The Attrib field describes what the counter value represents (e.g., percent utilization, completions/second, etc.). The size identifies the size in memory occupied by the counter variable. The DetailLevel represents the complexity of the counter—corresponding to the relative cost for maintaining it. The scale value represents a scaling factor for purposes of display. The DisplayType serves as a hint to a counter consumer on how the resulting counter will be displayed, such as adding a percentage sign, or truncate and display as an integer. The Offset provides a value corresponding to the location of the counter value within the counter structure.

Including the DataItemID and Offset to describe a counter exposed by a counter provider facilitates selectively accessing/enabling only a portion of a potentially large number of counters supported by a single counter provider dataset.

A dataset instance block specified according to a Dataset Instance Block structure 430 is followed by a provider counter data block (having a layout specified by the above-mentioned counter provider template) and an instance name string—to the extent a name exists. The following is a description of the Dataset Instance Block structure 430.

```
typedef struct _DATASET_INSTANCE_BLOCK {
    GUID      DatasetGuid;
    ULONG     Version;
    ULONG     InstanceId;
    ULONG     InstanceNameOffset;
    ULONG     InstanceNameSize;
    ULONG     ParentInstanceId;
    BYTE      DataItemData[1];
} DATASET_INSTANCE_BLOCK, *
PDATASET_INSTANCE_BLOCK;
```

The DatasetGuid is a unique value assigned to a particular dataset. The version number distinguishes versions of the instance block for an identified dataset. The InstanceId identifies a particular instance of a block of counters. InstanceId values are unique within the dataset definition from which it is derived. The InstanceNameOffset specifies an offset for the data structure where a user-friendly name for the counter block instance is kept. The InstanceNameSize provides the length of the instance name. The ParentInstanceId provides, if applicable, the instance ID of a parent's instance block. The CounterData array is the place holder for the counter values.

A registration information structure 440 specifies a container (GUID) for storing information that can be used to identify the counter provider.

Having described a set of data structures enabling a counter provider of the provider application 302 to register and specify performance counters, attention is directed to a set of data structures that facilitate querying, by the consumer application 322, the counters maintained by the provider application 302 in the performance counter structure 306 for a counter provider. In an embodiment of the invention, a dataset registration structure 450 and a set of counter registration structures 460 (described herein below) specify a query originating from the consumer application 322 for counter information from particular identified counters (specified by a combination of counter provider dataset identification (GUID) and counter identifications). In an embodiment of the invention, the dataset registration structure 450 is defined in the following manner.

```
typedef struct __DATASET_REG_INFO {
    GUID       DataSetGuid; //identifies the dataset
    GUID       ParentDataSetGuid; // 0s if no parent dataset
    DWORD      DetailLevel;
    DWORD      DefaultDataItem; //default performance counter value
    DWORD      NumDataItems;//number of counters in this dataset
    DWORD      InstanceType;
    DWORD      dwTotalSize; //total size of the structure,
including all strings and names
    DWORD      dwStringTableOffset; // Offset to this structure
that point to a table specifying the explanation text/strings that describe all
the counters as well as the names of all the counters in this dataset.
    DWORD      dwStringTableSize;// size of string table
    DWORD      dwLocaleNameOffset;// offset to this data
structure that describes the locale specific names of all the counters in this
datase
    DWORD      dwLocaleHelpOffset;//offset to the explanation
texts in local-specific language
    DWORD      dwEngNameOffset;// offset to this data
structure that describes the English names of all the counters in this dataset
    DWORD      dwEngHelpOffset; //offset to the explanation
texts in English language
} DATASET_REG_INFO, * PDATASET_REG_INFO;
typedef struct __DATAITEM_REG_INFO {
    DWORD      DataItemId;         // max of 64K counters
                                   per GUID instance
    DWORD      Type;
    LONGLONG   Attrib;
    DWORD      Size;
    DWORD      DetailLevel;
    DWORD      DefaultScale;
    DWORD      dwLocaleNameOffset;
    DWORD      dwLocaleHelpOffset;
    DWORD      dwEngNameOffset;
    DWORD      dwEngHelpOffset;
} DATAITEM_REG_INFO, * PDATAITEM_REG_INFO;
```

The above-identified Dataitem parameters have been described herein above, and therefore their definitions are not be repeated.

The Dataset_Reg_Info structure 450 specifies a request for information from a provider dataset defined by a DataSetGuid value. A set of DataItem_Reg_Info structures 460 (the size of the set being specified by a value stored within the NumDataItems parameter of the Dataset registration structure 450) follows the Dataset_Reg_Info structure 450. A buffer follows including name/help strings. The value of dwTotalSize should be sizeof(DATASET_REG_INFO)+NumDataItems * sizeof(DATAITEM_REG_INFO)+dwStringTableSize. The value of dwNameOffset should be sizeof(DATASET_REG_INFO)+NumDataItems * sizeof (DATAITEM_REG_INFO).

A DataItem Identifier structure 470 is used within the consumer side of API 305 to (1) identify dataitems in a specific query in an AddDataItems( ) consumer side method supported by the API 305; and to (2) return dataitem layout information from a QueryDataItemInfo( ) consumer side method of the API 305, the layout information is used to extract individual dataitem data from a QueryDataItemData( ) method of the API 305. The following is a summary of an exemplary DataItem Identifier structure 470.

```
typedef struct __DATAITEM_IDENTIFIER {
    GUID       DataSetGuid;
    DWORD      Status;
    DWORD      Size;
    DWORD      DataItemId;
    DWORD      Index;
} DATAITEM_IDENTIFIER, * PDATAITEM_IDENTIFIER;
```

A DATAITEM_IDENTIFIER list structure is an array of DATAITEM_IDENTIFIER blocks. Each DATAITEM_IDENTIFIER block contains a DATAITEM_IDENTIFIER structure followed by a Unicode instance name string. The DATAITEM_IDENTIFIER structure is, by way of example, an 8-byte multiple value. That is, the buffer for storing an instance name is an 8-byte multiple—since the DATAITEM_IDENTIFIER structure itself is an 8-byte multiple size. An InstanceName string starts at a location equal to ((LPBYTE) PDATAITEM_IDENTIFIER)+sizeof(DATAITEM_IDENTIFIER).

The data structures described below are combined to form the structure returned when a consumer requests a dataset from a provider.

```
typedef struct __DATABLOCK_HEADER {
    DWORD      dwTotalSize;
    DWORD      dwNumCounters;
    LONGLONG   PerfTimeStamp;
    LONGLONG   PerfTime100NSec;
    LONGLONG   PerfFreq;
} DATABLOCK_HEADER, * PDATABLOCK_HEADER;
typedef struct __DATAITEM_HEADER {
    DWORD dwSize; //
    DWORD dwType;
} DATAITEM_HEADER, * PDATAITEM_HEADER;
typedef struct __SINGLE_DATAITEM {
    union {
        DWORD       dwSize;
        DWORD       dwInstanceOffset;
    };
    DWORD       dwStatus;
    LONGLONG    lValue;
} SINGLE_DATAITEM, * PSINGLE_DATAITEM;
typedef struct __MULTI_INSTANCE {
    DWORD dwTotalSize;
    DWORD dwInstances;
    DWORD dwDataItemSize;
    DWORD dwStatus;
} MULTI_INSTANCE, * PMULTI_INSTANCE;
```

The four data structures listed above form the actual counter data block returned from a QueryDataItemData( ) method of the consumer-side portion of the API 305. The returned counter datablock is formed as a DATABLOCK_HEADER 480 structure followed by a sequence of dataitem data blocks. Each dataitem data block is formed as a DATAIT- EM_HEADER 490 structure followed by either one SINGLE_DATAITEM 492 structure (if there is no wildcard instances) or one MULTI_INSTANCE 494 structure followed by a sequence of SINGLE_DATAITEM 492 structures followed by a MULTI_SZ string buffer holding instance names.

A number of parameters are listed. It is noted that the size of the returned datablock (stored in the DATABLOCK_HEADER::dwTotalSize parameter) is, by way of example, the size (in bytes) of the whole block returned from QueryDataItemData( ) API. The parameter DATAITEM_HEADER::dwSize is the size of DATAITEM_HEADER itself plus the following SINGLE_DATAITEM or MULTI_INSTANCE structure. The parameter DATAITEM_HEADER::dwType specifies whether the returned datablock is a SINGLE_DATAITEM or MULTI_INSTANCE counter block. The SINGLE_DATAITEM::dwSize parameter specifies whether there is 4-byte or 8-byte dataitem data stored in CounterValue. This is used if the datablock is not inside a MULTI_INSTANCE structure. The parameter SINGLE_DATAITEM::dwInstanceOffset specifies the offset, from the beginning of the DATAITEM_HEADER structure, of the instance name. This is used when a SINGLE_DATAITEM block is part of a MULTI_INSTANCE structure. The MULTI_INSTANCE::dwTotalSize parameter is the size (in bytes) of the MULTI_INSTANCE structure itself followed by a sequence of SINGLE_DATAITEM structures a MULTI_SZ string buffer.

It is noted that the above-described data structures for defining and accessing performance counters are merely illustrative. As those skilled in the art will readily appreciate, there are many ways in which to specify structures for organizing and accessing the counter information rendered by the counter provider application 302.

Having described an exemplary set of data structures for carrying out the performance counter provider/consumer arrangement for delivering performance counters to applications, attention is directed to an application program interface supplied by the operating system API 305 to facilitate delivering performance counter data rendered by performance counter provider applications to requesting consumer applications. The API 305 comprises a set of callable interfaces. The functions and methods are described herein below by presenting prototypes, descriptions, inputs, returned values, behaviors and the purpose of the API to a caller.

Turning first to the provider side of the API 305 a set of methods are identified in FIG. 5 for implementing the functionality of the provider-side of the API 305. In an embodiment of the invention, RegisterInstrumentationSchema method 500 is called by the provider application 302 during application installation/system setup to register its counter provider schema (an XML document) in the repository 314 thereby persisting the counter provider even when the application 302 itself is not active). The following is a prototype of the RegisterInstrumentationSchema method 500.

```
DWORD
RegisterInstrumentationSchema(
    IN LPCWSTR SchemaResource
)
```

The RegisterInstrumentationSchema method 500 includes a single input parameter, "SchemaResource" that specifies a full path name for a schema definition file that contains registration/identification information regarding a counter schema, name and help strings, and any other definition information. The counter schema itself includes information identifying: a counter provider and a dataset (or datasets) offered by the provider—each dataset including a set of individual data items. In embodiments of the invention, registering the schema for a dataset provided by a counter provider is performed by any operating system installation facility that is capable of storing the schema information in the repository 314.

The API 305 also includes an UnregisterInstrumentationSchema method 510 for removing a provider schema identified by the input file path/name from the repository 314. The following is a prototype of the UnregisterInstrumentationSchema method 510.

```
DWORD
UnregisterInstrumentationSchema(
    IN LPCWSTR SchemaResource
)
```

The RegisterInstrumentationSchema method 500 registers a counter provider schema—not the actual counter provider. Thus, when the performance counter application 302 activates, the provider application 302 calls a RegisterInstumentationDataSource method 520 and a SetEnableInstrumentationNotification method 530 of the API 305 to register and enable the counter provider.

The RegisterInstrumentationDataSource method 520 enables the counter provider application 302 to register the existence of a provider described within a previously loaded schema within the repository 314. The following is a prototype of the RegisterInstrumentationDataSource method 520.

```
ULONG
RegisterInstrumentationDataSource(
    IN    LPCGUID      ProviderControlGuid,
    IN    LPCWSTR      ProviderName,
    OUT   PTRACEHANDLE hProvider
)
```

The ProviderControlGuid parameter should be unique and match a ProviderGuid value in a previously registered schema definition for the provider. The method returns a handle for the registered provider.

In an embodiment of the invention, a separate SetEnableInstrumentationNotification method 530 activates the provider and enables it to receive requests and provide responsive counter information. The following is a prototype of the SetEnableInstrumentationNotification method 530.

```
ULONG
SetEnableInstrumentationNotification(
    IN TRACEHANDLE            ProviderHandle,
    IN PTRACE_ENABLE_CONTEXT  EnableContext,
    IN WMIDPREQUEST           ControlCallback
)
```

In the above, prototype, the providerhandle parameter corresponds to the provider handle returned by the RegisterInstrumentationDataSource method 520. In an embodiment of the invention, the SetEnableInstrumentationNotification method 530 call registers a provider purpose that indicates the purpose of the registration. An EnableContext parameter specifies a context modifier that allows the counter consumer to customize how it wants to retrieve the performance counters, or to identify a specific counter provider or consumer. The extent of this is strictly up to the counter provider and may be made known to the consumer.

The SetEnableInstrumentationNotification method 530 also enables providers to specify their own, customized control callback. In an embodiment of the invention a default ControlCallback routine is provided to handle requests from consumers (e.g., EnableDataSet( ), AddDataItems( ), QueryDataItemData( ), etc). However, a provider can provide its own ControlCallback( ) routine to process its specific work (for example, a customized privilege check for consumer requests, internal state changes, filtering, etc). Once a provider has its own ControlCallback( ), the API 305 needs to know whether the provider ControlCallback( ) handles specific requests (so that the API 305 can decide whether default handling should take over processing duties).

The set of methods within the APIs 305 called by the provider application 302 includes an UnregisterInstrumentationDataSource method 540. The following is an exemplary prototype of the UnregisterInstrumentationDataSource method 540.

```
ULONG
UnregisterInstrumentationDataSource(
    IN TRACEHANDLE ProviderHandle
)
```

The UnregisterInstrumentationDataSource method 540 deregisters a previously registered provider identified by a handle previously provided to the application 302 by calling the RegisterInstrumentationDataSource method 520. Deregistering a provider ceases the provision of counter data by the provider. However, the previously registered schema definition remains in the repository 314. If a provider process terminates abnormally, the provider is automatically de-registered. In an embodiment of the invention, the UnregisterInstrumentationDataSource method 540 releases all Dataset Instance blocks associated with the unregistered provider by calling a DeleteInstanceBlock method 560 described herein below for each associated dataset instance block.

A SetDatasetTemplate method 545 is called by a provider during startup to specify a template that it will use to present its datasets and dataitems. The following is an exemplary prototype for the SetDatasetTemplate method 545.

```
ULONG
SetDataSetTemplate(
    IN TRACEHANDLE      ProviderHandle,
    IN LPCGUID          DataSetGuid,
    IN PDATASET_TEMPLATE pTemplate,
    IN DWORD            dwTemplateSize
)
```

A Provider calls the SetDateSetTemplate method 545 to load its own template. Use of the SetDataSetTemplate 545 avoids loading a schema template from a previously stored provider schema in the repository. This will speed up the provider application's startup time since there is no need to load and parse a provider schema. In the illustrative embodiment of the invention, as part of the build process, a resource compiler compiles the XML schema for a provider and generates the data structures into an include file. These data structures are collectively referred to as a template. A provider includes that include file, allocates the template DATASET_TEMPLATE and passes that down via the SetDatasetTemplate( ). Alternatively, one can look up an existing template in the repository (which has performance overhead). In the above provided prototype, the parameter pTemplate is a pointer (which allows the size of the template to differ between providers).

A CreateInstanceBlock method 550 is called by the provider application 302 to request a block of dataitems (counters) to be created based on a specified dataset template specified by a guid. The requested instance block is allocated within the memory space owned by the provider application 302. The following is an exemplary prototype for the CreateInstanceBlock method 550.

```
PDATASET_INSTANCE_BLOCK
CreateInstanceBlock(
    IN LPGUID      DatasetGuid
    IN LPCWSTR     szInstanceName
)
```

The szInstanceName is a user-friendly name for the instance of the dataset.

By default, each provider dataset creates at least one such dataset instance block for maintaining its associated dataitems (also referred to herein as "counters") within the address space of the provider application 302. Storing the dataitem data within the address space of the provider application 302 containing the provider dataset ensures that the counter data is uniquely identified in the system (i.e., there are no name conflicts—such as those arising when the counters are maintained within shared address space). The provider application 302 is thus also able to apply security policies limiting access to particular requesters.

It is further noted that if a counter provider dataset maintains the counters separate for each unique instance within the provider, then the provider dataset calls the CreateInstanceBlock method 550 to create a block for each unique instance.

A DeleteInstanceBlock method 560 is called by the provider application 302 to delete an instance block created by the CreateInstanceBlock method 550. The following is an exemplary prototype for the DeleteInstanceBlock method 560.

```
LONG
DeleteInstanceBlock(
    IN PDATASET_INSTANCE_BLOCK InstanceBlock
)
```

The DeleteInstanceBlock method 560 is called when a corresponding provider dataset instance is being deleted. If the provider's process terminates abnormally, then the memory space of the provider application 302 allocated to store the "InstanceBlocks" of the terminated provider dataset are released.

Turning to FIG. 6, a set of methods of the API 305 callable by the consumer application 322 are identified. An EnumerateDataset method 600 executes on behalf of the consumer application 322 to query for a list of datasets from a machine szMachineName. It is noted that szMachineName can be NULL for a local machine. The following is an exemplary prototype for the EnumerateDataset method 600.

```
        LONG
        EnumerateDataset(
                IN      LPCWSTR         szMachineName,
                OUT     PGUID           * DatasetArray,
                IN      DWORD           dwDataSet,
                OUT     LPDWORD         pdwDataset
        )
```

Prior to issuing the call, the consumer application 322 allocates memory for a dataset array for storing a list of GUIDs for the datasets on the identified machine (dwDataSet * sizeof (GUID)). The EnumerateDataSet method 600 thereafter fills in DataSetArray buffer with DataSetGuid values until there is either no more new DataSetGuid listed or the buffer space allocated for the dataset array is used up. The output parameter pdwDataSet points to a variable containing either the size of DataSetArray buffer space used (if the dataset array buffer is large enough to hold all returned DataSetGuid values), or the required size of the dataset array buffer needed (if the DataSetArray is not large enough to hold all DataSetGuids).

A QueryDatasetRegistrationInfo method 610 is invoked by the consumer application 322 to retrieve registration information about an identified dataset. The output points to a buffer for holding the returned registration information for a dataset. The following is an exemplary prototype for the QueryDatasetRegistrationInfo method 610.

```
        QueryDatasetRegistrationInfo(
                IN      LPCWSTR                 szMachineName,
                IN      LPCGUID                 DatasetGuid,
                OUT     PDATASET_REG_INFO       RegInfo,
                IN      DWORD                   dwSize,
                OUT     LPDWORD                 pdwSize
        )
```

Examples of information returned through the RegInfo parameter are dataitem type, dataitem format, dataitem name/ explain strings. In an embodiment of the invention, more particularized information is requested (rather than all the information associated with the identified provider dataset) through an information field identification. The caller should allocate the RegInfo buffer having a size, in sizeof(BYTE), of dwSize. On return, pdwSize will contain the size, in sizeof (BYTE), of the portion of the RegInfo buffer used (if RegInfo buffer is large enough to hold all returned data) or with an indicate that more buffer space is required.

An EnumerateDataSetInstance method 615 enumerates all current instances of datasets on a machine having a specified dataset guid. The following is an exemplary prototype for the EnumerateDataSetInstance method 615.

```
        LONG
        EnumerateDataSetInstance(
                IN      LPCWSTR         szMachine,
                IN      LPGUID          DataSetGuid,
                OUT     LPWSTR          szInstanceList,
                IN      DWORD           dwSize,
                OUT     LPDWORD         pdwSize
        )
```

The method will query all registered providers on the machine for all instances. The output szInstanceList is a MULTI_SZ Unicode strings contains all instances; while dwSize is the size, of sizeof(WCHAR), of the szInstanceList buffer. The pdwSize parameter is an address to a DWORD buffer within which the size, in sizeof(WCHAR), of actual buffer used (if <szInstanceList> buffer is large enough) is placed or the expected buffer required to hold all instances. The EnumerateDataSetInstance method 615 enumerates all instance blocks allocated by CreateInstanceBlock( ) calls from providers. The EnumerateDataSetInstance method 615 provides a way for consumer applications to enumerate dataset instances of specified dataset without forcing providers to collect all dataitem data for all instances. Returned instance names can be used in later AddDataItems( ) calls.

A EnableCounterDataset method 620 is invoked on behalf of the consumer application 322 or a control application to inform a counter provider (e.g., the provider application 302) to enable datasets or dataitems for a articular set of expensive dataitems, or a particular subset of instances. The ability to selectively invoke particular counters reduces the cost to computing resources associated with making counters available in a provider/consumer-based counter model by only enabling costly counters only on demand from a counter consumer or controller operating on behalf of counter consumers. The following is an exemplary prototype of the EnableCounterDataset method 620.

```
        LONG
        EnableCounterDataset(
                IN LPCWSTR              szMachine
                IN LPCGUID              DatasetGuid,
                IN PVOID                Filter,
                IN DWORD                dwFilterSize
        )
```

When invoked, the EnableCounterDataset method 620 triggers a control callback to the provider (for enable/disable notification) associated with the dataset identified by the datasetguid. A filter parameter specifies how a subset of the counter data can be returned. The subset can be selected by instance (specified by instance IDs) and/or counters (specified by dataitem IDs).

A CreateQueryHandle method 630 is invoked by the counter consumer application 322 to start a new dataitem data query from a machine identified by a szMachineName parameter. The following is an exemplary prototype for the CreateQueryHandle method 630.

```
        HANDLE
        CreateQueryHandle(
                IN LPCWSTR szMachineName
        )
```

The returned handle is used by the consumer application to subsequently query data items (an more particularly performance counter data) rendered by providers.

A QueryDataItemInfo method 635 enables a consumer to query dataitem information within a specific query. The following is an exemplary prototype for the QueryDataItemInfo method 635.

```
LONG
QueryDataItemInfo(
    IN      HANDLE                  QueryHandle,
    OUT     PDATEITEM_IDENTIFIER    DataItemList,
    IN      DWORD                   dwSize,
    OUT     LPDWORD                 pdwSize
)
```

The information returned from CounterList assists the consumer application to walk through a QueryDateItemData method 640, return, and extract correct dataitem data for each dataitem. The QueryDataItemInfo method returns an Index value. This is a 0-based index value specifying which DATEITEM_HEADER structure within DATABLOCK_HEADER block returned from the QueryDateItemData method 640 contains dataitem data for a specified dataitem. The caller should pre-allocate a DataItemList buffer with the size, in sizeof(BYTE), dwSize. In return, pdwSize will contain the size, in sizeof(BYTE), of actual buffer space used (if the buffer is large enough) or buffer required (if the buffer is not large enough).

A QueryDataItemData method 640 is invoked by the consumer application 322 to query a counter provider dataset (after obtaining a handle) for performance counter values. The following is an exemplary prototype for the QueryDataItemData method 640.

```
LONG
QueryDataItemData(
    IN      HANDLE              QueryHandle,
    IN      PVOID               Filter,
    OUT     DATABLOCK_HEADER    CounterDataBlock,
    IN      DWORD               dwSize,
    OUT     LPDWORD             pdwSize
)
```

The caller provides a QueryHandle (returned by the CreateQueryHandle method 630) and Filter (used to filter in/out specific instances for providers). The caller also allocates memory for the counter template and puts the size, in bytes, in the memory at pointer pdwSize. The QueryDataItemData method 640 returns a CounterDataBlock containing a sequence of definition blocks (for each counter added through a AddDataItems method 650) followed by the actual counter data. The pdwSize parameter contains the actual memory used (if allocated CounterDataBlock is large enough to hold all return data) or memory required.

The AddDataItems method 650 is invoked on behalf of the consumer application 322 to add a set of dataitems to the query list. The following is an exemplary prototype for the AddDataItems method 650.

```
LONG
AddDataItems(
    IN HANDLE                   QueryHandle,
    IN PDataItem_IDENTIFIER     DataItemList,
    IN DWORD                    dwDataItem
)
```

After the AddDataItems method 650 call is completed successfully, subsequent calls to the QueryDataItemsData method 640 with the same handle retrieves dataitem data from the new provider dataset. For each dataitem in the DataItemList input parameter, the API 305 triggers a control callback to the counter provider (for possible security checks and reference updates). In an embodiment of the invention, the API 305 also performs access checks based on a security attrribibute parameter in a provider registration call (RegisterInstrumentationDataSource method 520). On return, a CounterStatus element in each DATAITEM_IDENTIFIER structure contains the status returned for the dataitem (for example, "Succeed", "Provider Not Found", "Incorrect CounterId", "Provider Not Active", "Access Denied", etc).

A DeleteDataItem method 660 enables the consumer application 322 to remove a set of dataitems from its query list. The following is an exemplary prototype for the DeleteDataItem method 660.

```
LONG
DeleteDataItem(
    IN HANDLE                   QueryHandle,
    IN PDATAITEM_IDENTIFIER     DataItemList,
    IN DWORD                    dwDataItem
)
```

The request to remove a dataitem takes effect on subsequent calls to the QueryDataItemData method 640 with the same handle. The API 305 ignores dataitems that are not added to the query through the AddDataItem method 650. Other dataitems are removed by triggering a control callback to counter providers (for possible reference update).

A CloseQueryHandle method 670 enables the consumer application 322 to close the handle returned from the CreateQueryHandle method 630 call and releases resources associated to it. By way of example, the DeleteDataItems method 660 is called for all dataitems added by AddDataItems method 650 calls). The following is an exemplary prototype for the CloseQueryHandle method 670.

```
LONG
CloseQueryHandle(
    IN HANDLE ProviderHandle
)
```

The CloseQueryHandle method 670 also triggers control callback functions (for possible reference update) to providers for dataitems added to the handle through the AddDataItems method 650.

In an embodiment of the invention, in addition to the above-described methods, the consumer-side API methods include a method for querying a single dataitem value and modifying a single dataitem value. Such methods are invoked under circumstances triggering a control callback to invoke security/authentication mechanisms.

Figure 7:
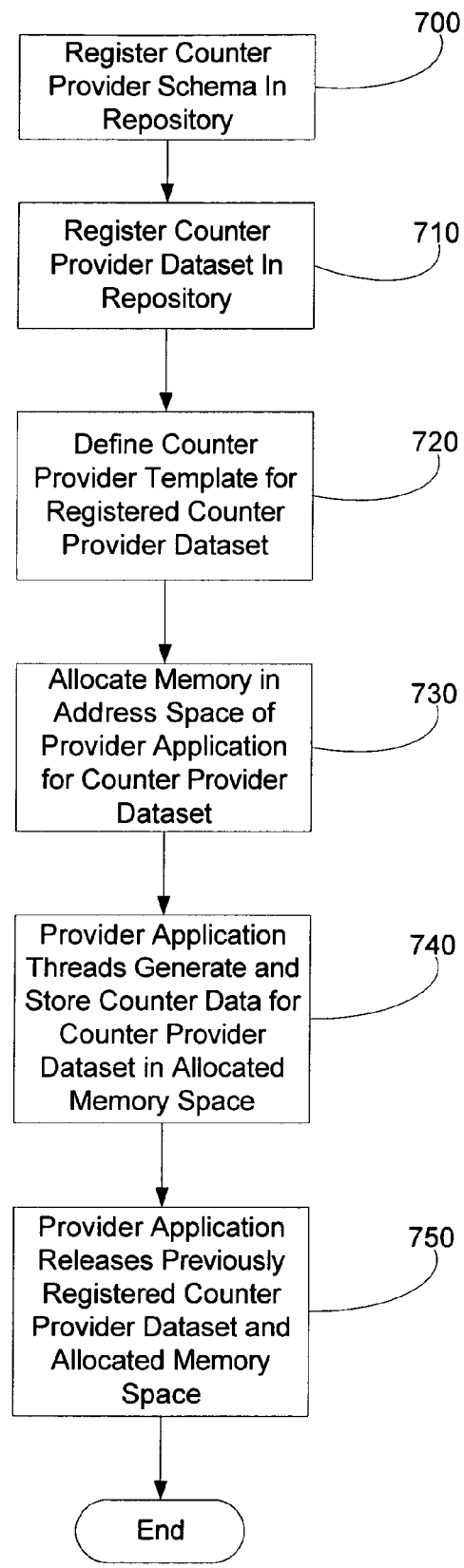
FIG. 7 is a flowchart summarizing the steps performed by a counter provider application to establish a performance counter for rendering one or more performance counters within its address space for a counter consumer application.

Having described the architecture, including the interfaces of an exemplary API 305, for carrying out the present invention, attention is directed to FIG. 7 that provides a set of steps representing a method for the counter provider application 302 to establish a performance counter for rendering one or more performance counters for the counter consumer application 322. As implied by the more general descriptive names given to the methods and parameters (e.g., dataitem, dataset) described above, the performance counters are a particular example of the more general passing data items via an operating system's allocation of memory within an application address space. Initially, during step 700, the provider application 302 invokes the RegisterInstrumentationSchema method 500 to register a counter provider schema within the repository 314. This step stores the path of an XML file containing a description of, and help information for, the counter provider. The counter provider description within the XML file includes, for example, counter schema, counter names and help strings. Registering the provider schema persists the counter provider so that counter consumers can be notified of its existence even when it is not executing.

The steps that follow are executed at startup of the provider application. Furthermore, it is noted that the following sequence of steps is executed separately for each provider dataset that the provider application 302 seeks to register.

At step 710 the RegisterInstrumentationDatasource method method 520 is invoked by the provider application during startup to register the existence of a provider described within a previously loaded schema within the repository 314. A provider GUID passed during this provider dataset registration step matches a provider GUID within the counter provider schema registered within the repository 314 during step 700. During a second stage of provider registration, the provider application 302 invokes the SetEnableInstrumentationNotification method 530 to register a control callback for the provider.

Next, during step 720 the SetDataSetTemplate method 545 is called to specify a dataset template for the counter provider registered during step 710. The template is specified by the counter provider dataset GUID. The template provides a guide for the infrastructure to build the performance counter structure 306 for storing counter data/information associated with the identified counter provider dataset.

At step 730 the provider application invokes the CreateInstanceBlock method 550 to create an instance block allocated within the address space owned by the provider application 302 for the performance counter structure 306 the instance block is modeled after the counter provider dataset template specified during step 720. The allocated memory is provided a local name that, when combined with the unique identifier assigned to the counter provider dataset, uniquely specifies the performance counter structure 306 and ensures that its identification will not conflict with names claimed by other entities in the system. At this time the callback function 318 is established for the provider that will return values corresponding to the counter/dataitems associated with the instance block.

Thereafter, at step 740 the provider application 302, and more particularly counter provider threads within the provider application 302 commence storing counter data within the performance counter structure 306 according to the locations specified by the counter provider template specified for the provider dataset.

Finally at step 750, when the provider application 302 terminates, it calls the UnregisterInstrumentationDatasource method 540 to deregister the previously registered provider identified by a handle (previously provided to the application 302 by calling the RegisterInstrumentationDataSource method 520). Deregistering a provider ceases the provision of counter data by the provider. However, the previously registered schema definition remains in the repository 314. In an embodiment of the invention, the UnregisterInstrumentationDataSource method 540 releases all Dataset Instance blocks associated with the unregistered provider by calling the DeleteInstanceBlock method 560 for each associated dataset instance block.

Figure 8:
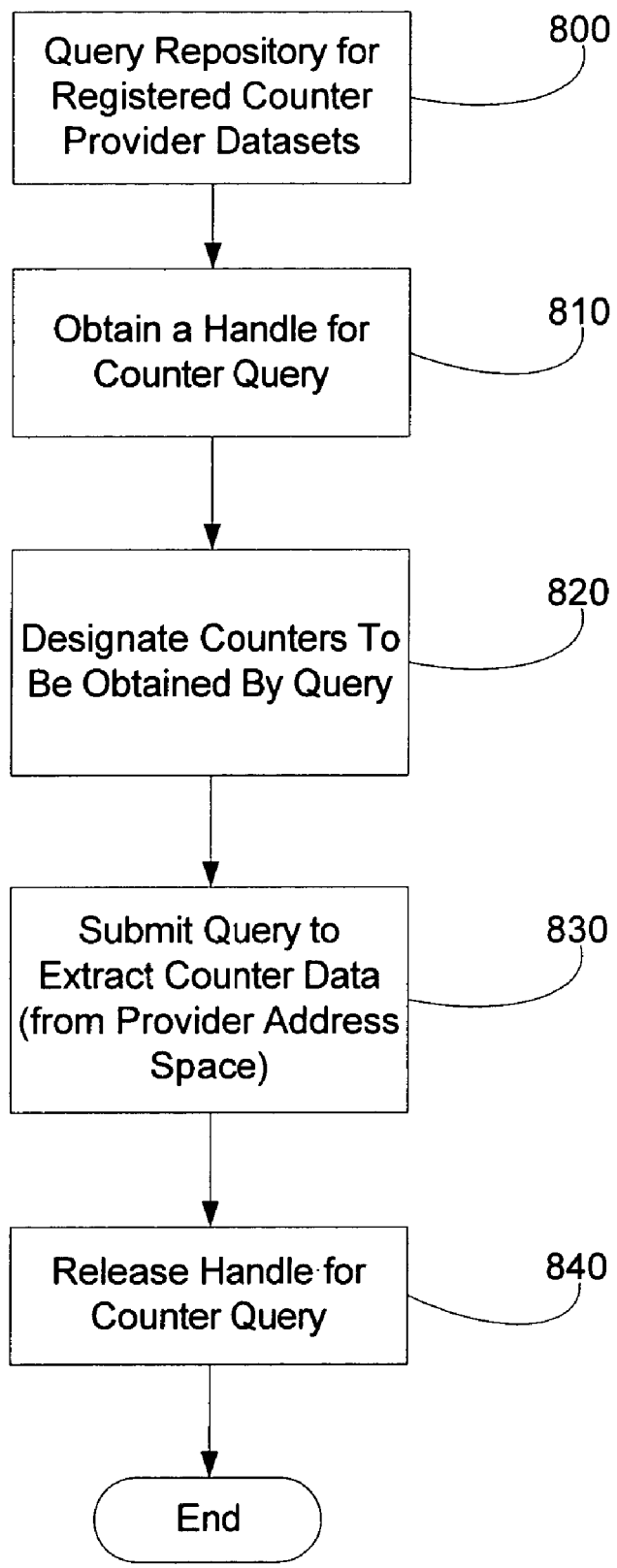
FIG. 8 is a flowchart summarizing the steps performed for retrieving performance counter data from the provider application.

Turning to FIG. 8 a set of steps summarize a method for retrieving performance counter data from the provider application 302 that is currently operating at step 740 of the above-described sequence of steps/stages provider application operation. Initially, during step 800 the consumer application 322 invokes the EnumerateDataSet method 600 and QueryDataSetRegistrationInfo method 610 to query, from repository 314, all counter provider datasets that the current operating system environment can provide—that is, all counter provider datasets currently registered in the repository 314. The retrieved information includes, by way of example, provider dataset schema information (e.g., supported dataitems/counters, counter types, etc). Based upon the provider dataset schema information, the consumer application 322 determines the counters from which counter data will be requested. Step 800 can be by-passed by consumer applications that already have this information.

Next at step 810 the application 322 invokes the CreateQueryHandle method 630 to establish a system identification for a counter request by the consumer application 322.

Thereafter, during step 820 the consumer application calls the AddDataItems method 650 to add a set of counters from provider datasets (identified by a GUIDs) to a counter query list. This action need only be taken once by an application that repeatedly calls a same set of counters from a provider dataset. Information needed to determine the content of a counter list array identifying the counters of interest is gained from the previously executed step 800, or in other cases the counter list array is hard-coded.

After setting up the query for retrieving particular counter data from a counter provider, the consumer application 322, during step 830, invokes the QueryDataItemData method 640 to retrieve data from the particular counter provider. The operating system 312 identifies and forwards performance counter requests to the performance counter provider applications based on passed-in counter dataset GUID and schema information stored in the repository 314. The passed parameters include a query handle identifying the request from the consumer application 322, an optional filter, a template identifying the requested counter data, and the size of memory occupied by the template.

In response, the operating system 312 looks up the GUID of the counter provider dataset identified in the QueryDataITemData( ) method 640 call and locates the counter provider application's process and invokes identified provider's registered callback function (e.g., callback 318). The callback function, executing within the process space of the provider application (e.g., provider application 302) that contains the requested dataitems/counter data, copies the requested counter data maintained by a structure (e.g., performance counter structure 306) within the provider application address space, and places the copied counter data into a buffer that is returned to the consumer application 322.

When the consumer application 322 no longer needs the counter data from the provider application 302, the consumer application 322 invokes the CloseQueryHandle method 670 to release the query handle. It is noted that the above-described sequences of steps performed by a provider application 302 and a consumer application 322 are exemplary. As those skilled in the art will readily appreciate, setting up, providing and consuming counter information can occur in a variety of ways in various embodiments of the invention.

It will be appreciated by those skilled in the art that a new and useful API-based method and framework for providing/consuming performance counters has been described herein. In view of the many possible computing environments to which the principles of this invention may be applied and the flexibility of designing and carrying out software development/performance evaluation tools, it should be recognized that the embodiments described herein are meant to be illustrative and should not be taken as limiting the scope of invention. Those skilled in the art to which the present invention applies will appreciate that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A performance counter framework for rendering software performance counter data in a computer system, the performance counter framework comprising:
a processor;
an operating system executed by the processor;
computer-readable storage media including computer-readable instructions and program modules executable by the processor;
a performance counter provider application process executed by the processor and stored on the computer-readable storage media, the performance counter provider application process enabled to generate raw performance counter information corresponding to software performance in the computer system;
a performance counter consumer application process executed by the processor and stored on the computer-readable storage media, the performance counter consumer application process enabled to receive and process the raw performance counter information generated by the performance counter provider application process;
a counter provider application program interface (API) of the operating system, stored on the computer-readable media, called by the performance counter provider application process, and enabled to:
register a description corresponding to the performance counter provider application process with the operating system for storage in a repository, the repository being located external to both the performance counter provider application process and the performance counter consumer application process;
allocate a performance counter structure within an address space of the performance counter provider application process, the address space designated by the operating system;
automatically assign, with the counter provider application process, an access function for retrieving performance counter data from the performance counter structure, the access function enabled to be invoked via the operating system by the performance counter consumer application process;
during a run-time of the performance counter provider application process, register a performance counter provider dataset including referencing the description from the repository via a GUID (Globally Unique Identifier) of the performance counter provider application process; and
provide a counter query function called by the performance counter consumer application process and enabled to:
extract the GUID of the performance counter provider application process from the repository, and
retrieve counter data corresponding to the GUID of the performance counter provider application process from the performance counter structure within the address space of the performance counter provider application process by invoking the access function via the operating system.

2. The performance counter framework of claim 1, wherein the access function operates within the address space of the performance counter provider application process by creating a thread to retrieve the performance counter data from the performance counter structure and return the performance counter to a buffer designated by the performance counter consumer application process.

3. The performance counter framework of claim 2, wherein the access function is a callback function.

4. The performance counter framework of claim 1, wherein the description corresponding to the performance counter provider application process comprises a data template and at least one schema definition describing the performance counter data.

5. The performance counter framework of claim 1, wherein the counter provider API requests a block of data items to be created according to a specified dataset template.

6. The performance counter framework of claim 1, wherein the counter provider API provides a list of registered datasets.

7. A method for rendering software performance counter data in a computer system including a processor, an operating system executed by the processor, a performance counter provider application process and a performance counter consumer application process, the method comprising:
providing, via the operating system, an application program interface comprising a set of functions stored as computer-executable instructions on a computer-readable storage medium and executable by the processor, the set of functions comprising a counter registration API function and a counter query API function;
calling, by the performance counter provider application process, the counter registration API function to;
register a description corresponding to the performance counter provider application process with the operating system for storage in a repository, the repository being located external to both the performance counter provider application process and the performance counter consumer application process;
allocate a performance counter structure within an address space of the performance counter provider application process, the address space designated by the operating system;
automatically assign an access function for retrieving the software performance counter data from the performance counter structure, the access function enabled to be invoked via the operating system by the counter consumer application process; and
during a run-time of the performance counter provider application process, register a performance counter provider dataset including referencing the description from the repository via a GUID (Globally Unique Identifier) of the performance counter provider application process,
wherein the performance counter provider application process includes computer-executable instructions stored on the computer-readable medium and executable by the processor and is enabled to generate raw performance counter information corresponding to software performance in the computer system; and
calling, by the performance counter consumer application process, the counter query API function to;
extract the GUID of the performance counter provider application process from the repository, and
retrieve counter data corresponding to the GUID of the performance counter provider application from the performance counter structure within the address space of the counter provider application process by invoking the access function via the operating system.

8. The method of claim 7, wherein the access function operates within the address space of the performance counter provider application process to retrieve the software performance counter data from the performance counter structure.

9. The method of claim 8, wherein the access function is a callback function.

10. The performance counter framework of claim 7, wherein the counter registration API function further supports specifying a data template describing the software performance counter data.

11. The method of claim 7, further comprising installing a description of the software performance data furnished by a provider associated with the performance counter provider application process.

12. The method of claim 11, wherein the description of the software performance data includes a performance counter data schema.

13. The method of claim 7, further comprising the step of:
 requesting a block of data items to be created according to a specified dataset template.

14. The method of claim 7, further comprising providing a list of registered datasets.

15. A computer-readable storage medium including a first set of computer-executable instructions facilitating rendering software performance counter data in a system including a processor and an operating system executing on the processor, a performance counter provider application process and a performance counter consumer application process, the first set of computer-executable instructions executable by the processor and facilitating executing the steps of:
 providing, via the operating system, an application program interface comprising a set of functions, the set of functions comprising a counter registration API function and a counter query API function;
 calling, by the performance counter provider application process, the counter registration API function to;
  register a description corresponding to the performance counter provider application process with the operating system for storage in a repository, the repository being located external to both the performance counter provider application process and the performance counter consumer application process;
  allocate a performance counter structure within an address space of the performance counter provider application process, the address space designated by the operating system;
  automatically assign an access function for retrieving the software performance counter data from the performance counter structure, the access function enabled to be invoked via the operating system by the counter consumer application process; and
  during a run-time of the performance counter provider application process, register a performance counter provider dataset including referencing the description from the repository via a GUID (Globally Unique Identifier) of the performance counter provider application process,
 wherein the performance counter provider application process includes computer-executable instructions stored on the computer-readable medium and executable by the processor and is enabled to generate raw performance counter information corresponding to software performance in the computer system; and
 calling, by the performance counter consumer application process, the counter query API function to:
  extract the GUID of the performance counter provider application process from the repository, and
  retrieve counter data corresponding to the GUID of the performance counter provider application from the performance counter structure within the address space of the performance counter provider application process by invoking the access function via the operating system.

16. The computer-readable storage medium of claim 15, wherein the access function operates within the address space of the performance counter provider application process to retrieve the software performance counter data from the performance counter structure.

17. The computer-readable storage medium of claim 16, wherein the access function is a callback function.

18. The computer-readable storage medium of claim 15, wherein the counter registration API function further supports specifying a data template describing the software performance counter data.

19. The computer-readable storage medium of claim 15, further comprising a second set of computer executable instructions executable by the processor and facilitating performing the step of installing a description of the software performance counter data furnished by a provider associated with the performance counter provider application process.

20. The computer-readable storage medium of claim 19, wherein the description of the software performance data includes a performance counter data schema.

21. The computer-readable storage medium of claim 15, further comprising a third set of computer executable instructions executable by the processor and facilitating performing the step of:
 requesting a block of data items to be created according to a specified dataset template.

22. The computer-readable storage medium of claim 15, further comprising a fourth set of computer executable instructions executable by the processor and facilitating performing the step of:
 providing a list of registered datasets.

23. A method for maintaining and providing software performance counter data via an operating system interface of an operating system executing on a processor, the software performance counter data rendered by counter provider application processes for use by performance counter consumer application processes, the method comprising the steps of:
 providing, via the operating system, an application program interface comprising a set of functions stored as computer-executable instructions on a computer-readable storage medium and executable by the processor;
 calling, by a performance counter provider application process, a first function of the set of functions for registering a counter provider associated with the performance counter provider application process within a repository of counter provider descriptions, wherein
  each counter provider entry in the repository includes an indication of a performance counter structure within an address space of a corresponding performance counter provider application process, the address space designated by the operating system, and an access function for retrieving performance counter data from the performance counter structure, and
  the repository is located external to both the performance counter provider application processes and the performance counter consumer application processes;
 storing corresponding software performance counter information within the performance counter structure;

calling, by the performance counter provider application process, a second function of the set of functions for registering, during a run-time of the performance counter provider application process, a performance counter provider dataset including referencing the description from the repository via a GUID (Globally Unique Identifier) of the performance counter provider application process, and calling a third function of the set of functions for extracting the GUID of the performance counter provider application process and for retrieving the performance counter information corresponding to the GUID of the performance counter provider application process from the address space within the performance counter provider application process via the access function, in response to a performance counter query from a performance counter consumer application process specifying the counter provider.

24. A performance counter provider application process supported by an operating system of a computer for use in a performance counter system embodying a performance counter provider/consumer model, the performance counter provider application process comprising computer-executable instructions on a computer-readable storage medium for:

requesting, via an application program interface, the operating system to register a description corresponding to the performance counter provider application for storage in a repository, the repository being located external to both the performance counter provider application and to a performance counter consumer application, and to allocate a memory space within the performance counter provider application process for a performance counter data structure;

storing software performance counter information corresponding to the performance counter provider application process within the memory space; and providing, by the application program, access by a registered callback function, invoked by a call to the application program interface by a performance counter consumer application process, to the memory space containing the performance counter data structure via a GUID (Globally Unique Identifier) of the performance counter provider application process.

25. A performance counter system in a computer comprising:

a processor, an operating system executed by the processor;

a performance counter provider application process executed by the processor;

a performance counter consumer application process executed by the processor; and an operating system performance counter application program interface comprising:

a first set of functions stored as computer-executable instructions on a computer-readable storage media, executable by the processor, and callable by the performance counter provider application process to:

register a corresponding software performance counter provider in a repository, allocate a performance counter structure within an address space of the performance counter provider application process, and during a run-time of the performance counter provider application process, register a performance counter provider dataset including referencing the corresponding software performance counter provider via a GUID (Globally Unique Identifier) of the performance counter provider application process; and a second set of functions stored as computer-executable instructions on the computer-readable storage media and executable by the processor for serving requests originating from the performance counter consumer application process to enumerate and access the performance counter provider application process based on the corresponding GUID.

* * * * *

UNITED STATES PATENT AND TRADEMARK OFFICE
CERTIFICATE OF CORRECTION

PATENT NO. : 7,698,397 B2  
APPLICATION NO. : 10/608864  
DATED : April 13, 2010  
INVENTOR(S) : Jee Fung Pang et al.

Page 1 of 1

It is certified that error appears in the above-identified patent and that said Letters Patent is hereby corrected as shown below:

In column 24, line 32, in Claim 7, delete "to;" and insert -- to: --, therefor.

In column 24, line 62, in Claim 7, delete "to;" and insert -- to: --, therefor.

In column 25, line 38, in Claim 15, delete "to;" and insert -- to: --, therefor.

In column 25, line 67, in Claim 15, delete "to;" and insert -- to: --, therefor.

Signed and Sealed this
Nineteenth Day of July, 2011

David J. Kappos
*Director of the United States Patent and Trademark Office*